(12) United States Patent
Folk et al.

(10) Patent No.: US 11,896,941 B2
(45) Date of Patent: Feb. 13, 2024

(54) INSERT ASSEMBLY FOR FOAMING DEVICE

(71) Applicant: Sonny's HFI Holdings, LLC, Wilmington, DE (US)

(72) Inventors: Daniel Folk, River Falls, WI (US); Ryan Olson, Cannon Falls, MN (US)

(73) Assignee: Sonny's HFI Holdings, LLC, Wilmington, DE (US)

( * ) Notice: Subject to any disclaimer, the term of this patent is extended or adjusted under 35 U.S.C. 154(b) by 0 days.

(21) Appl. No.: 18/123,574

(22) Filed: Mar. 20, 2023

(65) Prior Publication Data

US 2023/0226505 A1 Jul. 20, 2023

Related U.S. Application Data

(63) Continuation of application No. 17/224,280, filed on Apr. 7, 2021, now Pat. No. 11,633,703.
(Continued)

(51) Int. Cl.
*B01F 3/04* (2006.01)
*B01F 25/452* (2022.01)
(Continued)

(52) U.S. Cl.
CPC ........ *B01F 25/4522* (2022.01); *B01F 23/235* (2022.01); *B01F 33/811* (2022.01);
(Continued)

(58) Field of Classification Search
CPC .. B01F 23/235; B01F 25/4522; B01F 33/811; B01F 2101/24; B08B 3/003; B60S 3/04
(Continued)

(56) References Cited

U.S. PATENT DOCUMENTS 2,021,079 A 11/1935 Mittendorf et al.
2,118,290 A 5/1938 Black
(Continued)

FOREIGN PATENT DOCUMENTS

EP 0076451 A1 4/1983
WO 2019018637 A1 1/2019

OTHER PUBLICATIONS

International Preliminary Report on Patentability received for International Patent Application No. PCT/US2018/042879, dated Jan. 30, 2020.
(Continued)

*Primary Examiner* — Charles S Bushey
(74) *Attorney, Agent, or Firm* — Dorsey & Whitney LLP

(57) ABSTRACT

An insert assembly for a foam generating device includes a first insert and a second insert with a channel defined therethrough. Inserts may be formed by two shell halves that are coupleable to one another to define the channel. A plurality of ribs extends along an interior surface of the channel. Pad structures defined by porous media are provided in the channel and gripped by the plurality of ribs. The pads receive cleaning solution passing through the channel and cause foam to be generated by breaking-up the cleaning solution and agitating. The ribs may be arranged horizontally relative to a longitudinal axis of the insert assembly and retain the pads within the device. Inserts may be arranged in series along a longitudinal axis of the foam generating device with the pad structures arranged within the channel.

19 Claims, 10 Drawing Sheets

Related U.S. Application Data

(60) Provisional application No. 63/008,197, filed on Apr. 10, 2020.

(51) Int. Cl.

| | | |
|---|---|---|
| *B08B 3/00* | (2006.01) | |
| *B01F 23/235* | (2022.01) | |
| *B01F 33/81* | (2022.01) | |
| *B60S 3/04* | (2006.01) | |
| *B01F 101/24* | (2022.01) | |

(52) U.S. Cl.
 CPC .......... *B08B 3/003* (2013.01); *B01F 2101/24* (2022.01); *B60S 3/04* (2013.01)

(58) Field of Classification Search
 USPC .................................................. 261/DIG. 26
 See application file for complete search history.

(56) References Cited

U.S. PATENT DOCUMENTS

| | | |
|---|---|---|
| 2,118,295 A | 5/1938 | Crawford et al. |
| 2,236,084 A | 3/1941 | Brown |
| 2,506,179 A | 5/1950 | Taplin |
| 2,706,108 A | 4/1955 | Miner |
| 2,833,311 A | 5/1958 | Gaetano |
| 2,850,038 A | 9/1958 | Shabaker |
| 3,190,618 A | 6/1965 | Raphael |
| 3,323,550 A | 6/1967 | Lee |
| 3,375,855 A | 4/1968 | Deeks |
| 3,377,139 A | 4/1968 | Macgregor et al. |
| 3,386,458 A | 6/1968 | Wasserman et al. |
| 3,388,868 A | 6/1968 | Watson et al. |
| 3,532,126 A | 10/1970 | Boothe |
| 3,532,127 A | 10/1970 | Vogelsang et al. |
| 3,608,571 A | 9/1971 | Wilcox |
| 3,730,440 A | 5/1973 | Parkison |
| 3,744,762 A | 7/1973 | Schlicht |
| 3,791,587 A | 2/1974 | Drori |
| 3,806,097 A | 4/1974 | Devellian et al. |
| 3,941,355 A | 3/1976 | Simpson |
| 3,998,427 A | 12/1976 | Bentley |
| 4,069,976 A | 1/1978 | Chauvigne |
| 4,226,368 A | 10/1980 | Hunter |
| 4,253,608 A | 3/1981 | Hunter |
| 4,267,045 A | 5/1981 | Hoof |
| 4,514,095 A | 4/1985 | Ehrfeld et al. |
| 4,738,665 A | 4/1988 | Shepard |
| 4,869,849 A | 9/1989 | Hirose et al. |
| 4,917,687 A | 4/1990 | Oboyle |
| 5,005,604 A | 4/1991 | Aslanian |
| 5,036,880 A | 8/1991 | Safford et al. |
| 5,098,021 A | 3/1992 | Kah |
| 5,160,086 A | 11/1992 | Kuykendal et al. |
| 5,169,065 A | 12/1992 | Bloch |
| 5,213,260 A | 5/1993 | Tonkinson |
| 5,287,891 A | 2/1994 | Bourlon |
| 5,404,957 A | 4/1995 | Mccormack |
| 5,887,977 A | 3/1999 | Morikawa |
| 6,095,196 A | 8/2000 | Mccarty et al. |
| 6,238,081 B1 | 5/2001 | Sand |
| 6,244,297 B1 | 6/2001 | Baumann |
| 6,273,512 B1 | 8/2001 | Rajewski |
| 6,460,734 B1 | 10/2002 | Schroeder et al. |
| 6,471,146 B1 | 10/2002 | Kuykendal et al. |
| 7,520,661 B1 | 4/2009 | Lawson |
| 7,789,108 B1 | 9/2010 | Lawson |
| 7,909,502 B2 | 3/2011 | Ehrfeld et al. |
| 8,022,485 B2 | 9/2011 | Davies |
| 8,439,282 B2 | 5/2013 | Allen et al. |
| 8,500,042 B2 | 8/2013 | Brown et al. |
| 8,544,567 B2 | 10/2013 | Comeau et al. |
| 8,740,450 B2 | 6/2014 | Mogami et al. |
| 8,925,443 B2 | 1/2015 | Agarwal et al. |
| 9,132,393 B1 | 9/2015 | Ross |
| 9,258,949 B2 | 2/2016 | Nourian |
| 9,370,754 B2 | 6/2016 | Mcclimond |
| 9,433,954 B2 | 9/2016 | Analetto et al. |
| 9,561,481 B2 | 2/2017 | Schlueter et al. |
| 9,714,010 B2 | 7/2017 | Fazio et al. |
| 9,731,303 B2 | 8/2017 | Harris et al. |
| 9,943,815 B2 | 4/2018 | Matsumoto et al. |
| 10,589,236 B2 | 3/2020 | Mochizuki |
| 11,633,703 B2 * | 4/2023 | Folk ..................... B01F 23/235 |
| | | 261/21 |
| 2001/0015231 A1 | 8/2001 | Sand |
| 2001/0054515 A1 | 12/2001 | Eddison et al. |
| 2003/0039169 A1 | 2/2003 | Ehrfeld et al. |
| 2003/0209611 A1 | 11/2003 | Harris et al. |
| 2003/0212149 A1 | 11/2003 | Grundmann et al. |
| 2004/0182436 A1 | 9/2004 | Graham |
| 2005/0104024 A1 | 5/2005 | Oliver |
| 2010/0276820 A1 | 11/2010 | Mogami et al. |
| 2012/0018218 A1 | 1/2012 | Rosenhauch |
| 2013/0025169 A1 | 1/2013 | Mccarty et al. |
| 2013/0128688 A1 | 5/2013 | Doolin et al. |
| 2014/0042245 A1 | 2/2014 | Buckner |
| 2014/0291873 A1 | 10/2014 | Mcclimond |
| 2015/0137017 A1 | 5/2015 | Ambrosina et al. |
| 2015/0184806 A1 | 7/2015 | Beg et al. |
| 2015/0273489 A1 | 10/2015 | Harris et al. |
| 2018/0304285 A1 | 10/2018 | Mcclimond |
| 2019/0022607 A1 | 1/2019 | Flood |
| 2021/0252531 A1 | 8/2021 | Boily |
| 2021/0316258 A1 | 10/2021 | Folk et al. |
| 2021/0346895 A1 | 11/2021 | Schuller et al. |
| 2021/0354097 A1 | 11/2021 | Flood |
| 2022/0288612 A1 * | 9/2022 | Balzer ................... B05B 12/008 |

OTHER PUBLICATIONS

International Search Report and Written Opinion received for International Application No. PCT/US2018/042879, dated Oct. 12, 2018.

Preliminary Office Action dated Apr. 20, 2022 in connection with Brazilian patent application No. BR112020001161-4, 7 pages including English translation.

International Search Report and Written Opinion dated Aug. 10, 2021 in connection with International Patent Application No. PCT/US2021/031339, 12 pages.

International Search Report and Written Opinion dated Sep. 1, 2022 in connection with International Patent Application No. PCT/US2022/019509, 16 pages.

Examination Report dated Oct. 4, 2021 in connection with European patent application No. 18750054.1, 7 pages.

Examination Report dated Nov. 16, 2020 in connection with European patent application No. 18750054.1, 7 pages.

Examination Report dated Apr. 13, 2021 in connection with European patent application No. 18750054.1, 10 pages.

International Search Report and Written Opinion dated Oct. 12, 2018 in Application No. PCT/US2018/042879, 16 pages.

* cited by examiner

INSERT ASSEMBLY FOR FOAMING DEVICE

CROSS-REFERENCE TO RELATED APPLICATIONS

This application is a continuation of U.S. patent application Ser. No. 17/224,280, filed Apr. 7, 2021, now U.S. Pat. No. 11,633,703, which claims priority to U.S. Provisional Patent Application No. 63/008,197, filed Apr. 10, 2020, entitled "INSERT ASSEMBLY FOR FOAMING DEVICE," each of which is incorporated by reference herein, in the entirety and for all purposes.

FIELD

Disclosed are vehicle washing and related systems, and more particularly, to devices for facilitating foam generation.

BACKGROUND

Vehicle washing and related systems may use foam to facilitate certain cleaning operations. Soaps, detergents, degreasers, and/or other cleaning products may be diluted with water to form a cleaning solution. The cleaning solution may be agitated in order to generate a foam or other aerated substance that may be applied to a vehicle to facilitate cleaning. For example, agitation media may be used to interrupt a flow of the cleaning solution and aerate the solution for foam generation. In many traditional systems, the agitation media is locked in a rigid frame. The frame may trap the agitation media inside and block a flow path of the cleaning solution, thereby impeding system throughput. Conventional frames may therefore limit the adaptability of the system, including limiting the maintenance, replacement or addition of the agitation media. As such, the need continues to develop systems and techniques to facilitate foam generation in vehicle washing or related systems.

SUMMARY

Embodiments of the present disclosure are directed to inserts, assemblies, and devices for generating foam. Inserts may hold a plurality of pad structures or other agitation media within a shell. The shell may define a channel therethrough. The shell may be formed by two shell halves that are configured to be coupled to one another to define the channel. The shell may include a plurality of ribs that extend along an interior surface of the shell and along a substantially horizontal direction within the channel relative to a longitudinal axis of the insert. The pad structure may be gripped or pinched by the plurality of ribs. A cleaning solution may be advanced through the pad structure for aeration, without being substantially obstructed by the shell itself. The insert may be a component of a modular assembly and releasably coupled with additional inserts, including additional inserts that have pad structures with agitation media of different porosities and other characteristics. The cleaning solution may thus pass through multiple stages of fluid agitation to generate a desired foam consistency and texture. Cleaning and replacement of the pad structures may also be simplified. The inserts and shell halves may each be separated from one another, and subsequently reassembled with new pad structures as needed.

In one embodiment, an insert assembly for a foam generating device includes a first insert. The first insert includes a first shell that defines a first channel therethrough. The first shell includes a first plurality of ribs that extend along an interior surface of the first shell within the first channel. The first insert further includes a first pad structure defined by porous media and being gripped by the first plurality of ribs and held within the first channel. The insert assembly further includes a second insert releasably coupled to the first insert. The second insert includes a second shell that defines a second channel therethrough. The second shell includes a second plurality of ribs that extend along an interior surface of the second shell within the second channel. The second insert further includes a second pad structure defined by porous media and being gripped by the second plurality of ribs and held within the second channel. The first and second inserts are arranged in series along a longitudinal axis of the foam generating device with the first pad structure and the second pad structure directly facing one another for fluid coupling therebetween. Further, the first plurality of ribs and the second plurality of ribs are arranged horizontally relative to the longitudinal axis.

In another embodiment, the first and second inserts may define an intermediate space between the first pad structure and the second pad structure when the first and second inserts are releasably coupled to one another. In this regard, the first and second inserts may be adapted to restrain the first and second pad structures, respectively, from entry into the intermediate space.

In another embodiment, the first plurality of ribs may be adapted to pinch the first pad structure in the first channel. This may partially deform the first pad structure and restrain axial movement of the first pad structure in the first channel.

In another embodiment, the porous media of the first pad structure has a first porosity and the porous media of the second pad structure has a second porosity. The first porosity may be different than the second porosity.

In another embodiment, the first pad structure may define a first stage of fluid agitation and the second pad structure may define a second stage of fluid agitation. The first and second pad structures are adapted to increase agitation of a fluid that serially traverses the first and second stages of fluid agitation. The first pad structure may be one of a plurality of first pad structures that collectively define the first stage of fluid agitation in the first shell. Further, the second pad structure may be one of a plurality of second pad structures that collectively define the second stage of fluid agitation in the second shell. In some cases, the first plurality of pad structures and the second plurality of pad structures are arranged substantially unobstructed from one another when the first and second insert are releasably coupled.

In another embodiment, the first insert defines a first coupling feature and the second insert defines a second coupling feature. The first and second coupling features may be operatively coupleable with one another. In some cases, the first coupling feature may be a grooved feature. The second coupling feature may be a clip receivable by the grooved feature.

In another embodiment, the insert assembly further includes a third insert releasably coupled to the second insert. The third insert includes a third shell that defines a third channel therethrough. The third shell may include a third plurality of ribs that extend along an interior surface of the third shell within the third channel. The third insert may further include a third pad structure defined by porous media and gripped by the third plurality of ribs and held within the third channel. The second and third inserts may be arranged in series along the longitudinal axis of the foam generating device with the second pad structure and the third pad structure directly facing one another for fluid coupling therebetween. The third plurality of ribs may be arranged horizontally relative to the longitudinal axis.

In another embodiment, another insert for a foam generating device is disclosed. The insert includes a first shell portion. The insert further includes a second shell portion releasably coupled to the first shell portion. The first and second shell portions may cooperate to define an insert inlet, an insert outlet, and a channel that extends along a longitudinal axis of the insert between the insert inlet and the insert outlet. The insert further includes a plurality of ribs in the channel arranged horizontally relative to the longitudinal axis. The insert further includes a plurality of pad structures defined by porous media. The plurality of pad structures is serially arranged along the longitudinal axis and engaged with the plurality of ribs within the channel.

In another embodiment, ribs of the plurality of ribs are spaced apart from one another along the longitudinal axis. In some cases, each of the plurality of pad structures are engaged with at least two ribs of the plurality of ribs.

In another embodiment, the first shell portion may include a first interior surface facing the channel. The second shell portion may include a second interior surface facing the channel. Further, the plurality of ribs includes a first plurality of ribs defined by the first shell portion and extending integrally from the first interior surface. The plurality of ribs further includes a second plurality of ribs defined by the second shell portion and extending integrally from the second interior surface.

In another embodiment, the first and second shell portions may be substantially symmetrical halves of a cylindrical cartridge. In some cases, the cylindrical cartridge may be a substantially elongated structure extending along the longitudinal axis of the insert.

In another embodiment, a first pad structure of the plurality of pad structures has a first thickness. Further, a second pad structure of the plurality of pad structures has a second thickness that is different than the first thickness.

In another embodiment, the insert inlet has an insert inlet width and the insert outlet has an insert outlet width. A width of one or more pad structures of the plurality of pad structures may be greater than both the insert inlet width and the insert outlet width.

In another embodiment, the porous media may include fibrous materials with pores between the fibrous materials for defining a fluid path therethrough. The fibrous materials may be adapted for agitation of fluid traversing the fluid path.

In another embodiment, the first shell portion may define a first coupling feature and the second shell portion may define a second coupling feature. The first and second coupling features may be configured to engage one another and constrain relative axial and rotational movement of the first and second shell portion. This may maintain the channel between the first and second shell portions.

In another embodiment, a foam generating device is disclosed. The foam generating device includes an insert, such as any of the inserts described herein. The foam generating device further includes a housing. The housing includes a housing inlet, a housing outlet, and an insert holding cavity. The insert holding cavity is adapted to hold the insert therein. A plurality of pad structures of one or more inserts are fluidly coupled with the housing inlet and the housing outlet.

In another embodiment, the housing includes an insert entry port connecting to the insert holding cavity and configured to receive the insert. In this regard, the foam generating device may further include a cap configured to cover the insert entry port. The cap may include a catch that is arranged to extend into the insert holding cavity when the cap covers the insert entry port. The catch may be configured for releasable attachment with the insert, thereby permitting movement of the insert via the cap.

In another embodiment, the insert may be a first insert and the foam generating device may include a second insert comprising another plurality pad structures formed from a porous material held therein. In some cases, the second insert may be releasably coupled to the first insert, opposite the catch, thereby permitting exit of the first and second inserts from the insert holding cavity via the cap.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
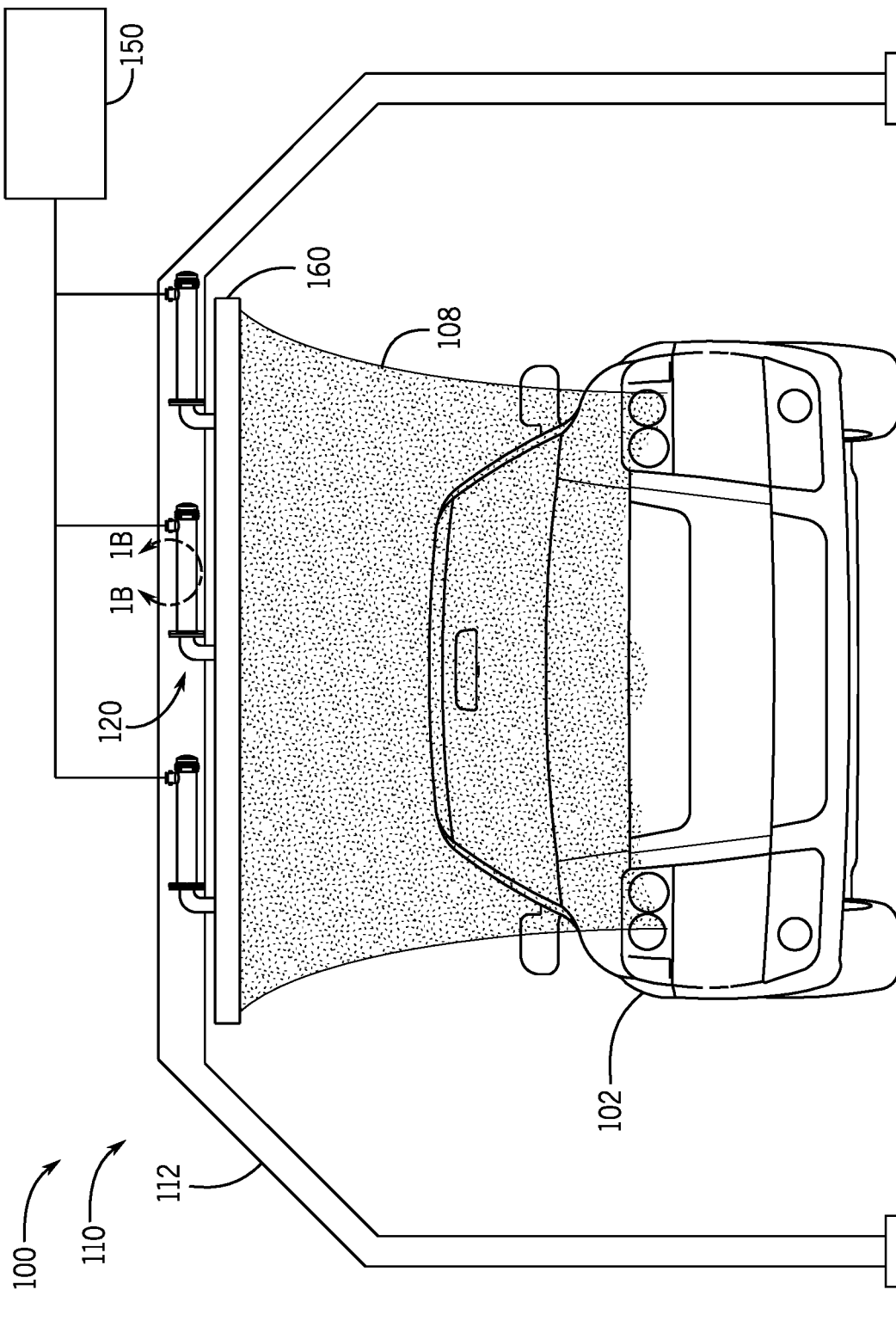
FIG. 1A depicts a system including a car washing assembly according to implementations of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes systems, methods, and apparatuses that embody various elements of the present disclosure. However, it should be understood that the described disclosure may be practiced in a variety of forms in addition to those described herein.

Described are inserts, insert assemblies, and foam generating devices operable for the production of foam, such as cleaning foam. Broadly, the foam produced may include a variety of aerated solutions having certain soaps, detergents, degreasers and so on, which may be used with various cleaning systems, including car washes. Inserts of the present disclosure may be adapted to hold a plurality of pad structures that are defined by porous or fibrous material. The pad structures are arranged to receive a flow of such solutions, break-up fluid flow, aerate the fluid flow, and generate foam. The pad structures may be pinched or held within the inserts to minimize blockages and obstructions along the flow path. In some cases, multiple inserts each having a plurality of pad structures may be coupled with one another to collectively define an insert assembly. The insert assembly thus provides multiple stages of fluid agitation that may be adapted to generate a desired foam consistency and texture.

To facilitate the foregoing, the insert may include a shell with a first shell portion and a second shell portion. The first and second shell portions may be substantially symmetrical halves of the shell. The first and second shell portions may cooperate to define a channel therethrough for receiving and holding one or more pad structures. For example, the first and second shell portions may be segments of a cylindrical structure and may generally define a concave interior surface. The shells may each have a plurality of ribs arranged along the interior surface and situated substantially horizontally relative to a longitudinal axis of the assembly. The plurality of ribs may be adapted to engage and contact the pad structures for holding the pad structures within the channel defined by the first and second shells. For example, the plurality of pad structures may be arranged in the channel and have an outer diameter that is larger than an inner diameter imparted by the ribs so that the pads are pinched by the ribs of each of the first and second shell structures. In this regard, the ribs can include a variety of structural features that facilitate retention of the pad structures within the channel. In one example, as shown and described below with respect to FIG. 5, the ribs can be defined by ridges or other structures that extend elongated along an interior surface of the channel. Additionally or alternatively, the ribs can include or refer to various other structures, including spikes, combs, knurling and the like to facilitate the retention of the pad structures within the channel.

The first and second shell structures may define an insert inlet at a first end of the insert, and an insert outlet at a second end of the insert. The channel extends between the insert inlet and the insert outlet. The plurality of pad structures, in the installed configuration, are held within the channel and fluidly connected with the insert inlet and the insert outlet. The insert inlet and the insert outlet may be substantially unobstructed by structural components or intermediate layers of the shell or foam generating device. As such, a cleaning-type solution may be advanced through the insert inlet, channel, and insert outlet for aeration using the pad structures, and without being substantially impaired or impeded by the shell structure itself.

Multiple inserts may be associated with one another to form an insert assembly. For example, the inserts may be components of a modular system in which two, three, four, or more inserts may be arranged in series to define multiple stages of fluid agitation. In this regard, each insert may be substantially analogous to the insert described above, and include a plurality of pad structures that are held within the respective insert by the corresponding plurality of ribs. The multiple inserts are arranged in series so that a pad structure of a first insert and a pad structure of a second insert are directly facing one another for fluid coupling therebetween. In this regard, the inserts may define an intermediate space between the respective pad structures that may be substantially free of intervening layers or structures or other impediments to flow. With the plurality of ribs holding or pinching the pad structures in place, the size of the intermediate space may be substantially maintained during fluid flow through the assembly.

The insert assembly or optionally an individual insert may be received by a foam generating device and may be used to generate a foam product. For example, a foam generating device may include a housing with an insert holding cavity that is adapted to receive the one or more inserts. The housing defines a housing inlet and a housing outlet. The housing inlet may be configured to receive a flow of a cleaning solution and direct the flow of solution to the one or more inserts of the insert holding cavity. The fluid flow is caused to traverse the one or more inserts to cause fluid agitation and generate foam. The one or more inserts are fluidly connected to the housing outlet where the foam may be dispensed.

The foam generating device may also facilitate insert and pad structure repair, maintenance, and replacement. The housing may define an insert entry port that defines a passage for receiving the one or more inserts and directing the inserts into the insert holding cavity. A cap may function to close the insert entry port. The cap may also include a catch on an underside that is adapted to releasably engage an insert and hold the insert within the insert holding cavity. To replace the pad structure, the cap may be loosened from the insert entry port and removed from the housing with the catch of the cap correspondingly removing the insert. As described herein, the insert may be separated from the catch and disassembled in order to remove the pad structure for cleaning or replacement with a new structure.

The following description of the drawings is presented for purposes of illustration and description, and is not intended to limit the disclosure.

FIG. 1A depicts a system 100 including a car wash assembly 110 and vehicle 102. The car wash assembly 110 is shown engaged in a cleaning operation for cleaning the vehicle 102 using a foam generating device 120, such as the foam generating devices of the present disclosure. The foam generating device 120 may include one or more inserts that collectively define an insert assembly and that are used to break a flow of a cleaning solution to generate a foam product.

For purposes of illustration, the car wash assembly 110 is shown in FIG. 1A as including a support 112, a manifold 160, cleaning solution source 150, and the foam generating device 120. The support 112 may be a structural member that supports the foam generating device 120, the manifold 160, and conduits and associated components of the cleaning solution source 150 above the vehicle 102.

The foam generating device 120 may be adapted to receive cleaning solution from the cleaning solution source 150. The cleaning solution may include a concentrate and/or diluted form or certain soaps, detergents, and/or degreasers. In this regard, it will be appreciated that the cleaning solution source 150 is shown in FIG. 1A schematically, and that in other examples, the cleaning solution source 150 may optionally include multiple other drums of solutions, conduits, diluent sources, controls, and so on in order to deliver cleaning solution to the foam generating device 120.

The foam generating device 120 is shown in FIG. 1A as one of group of foam generating devices. Each of the devices may be operable to receive the cleaning solution from the cleaning solution source 150 and to output a foam product or other aerated substance to the manifold 160. In some implementations, each foam generating device 120 receives cleaning solution from a dedicated cleaning solution source 150 such that each foam generating device 120 may dispense a foam that differs from other foam generating devices. In addition or alternatively, two or more foam generating devices 120 may be coupled to a single cleaning solution source 150 to enable the same foam to be dispensed from multiple foam generating devices 120. The manifold 160 may receive the foam output from the foam generating devices 120 and form a cascade 108 over the vehicle 102. The car wash assembly 110 may allow the vehicle 102 to pass through the cascade 108 to facilitate cleaning of the vehicle 102.

Figure 1B:
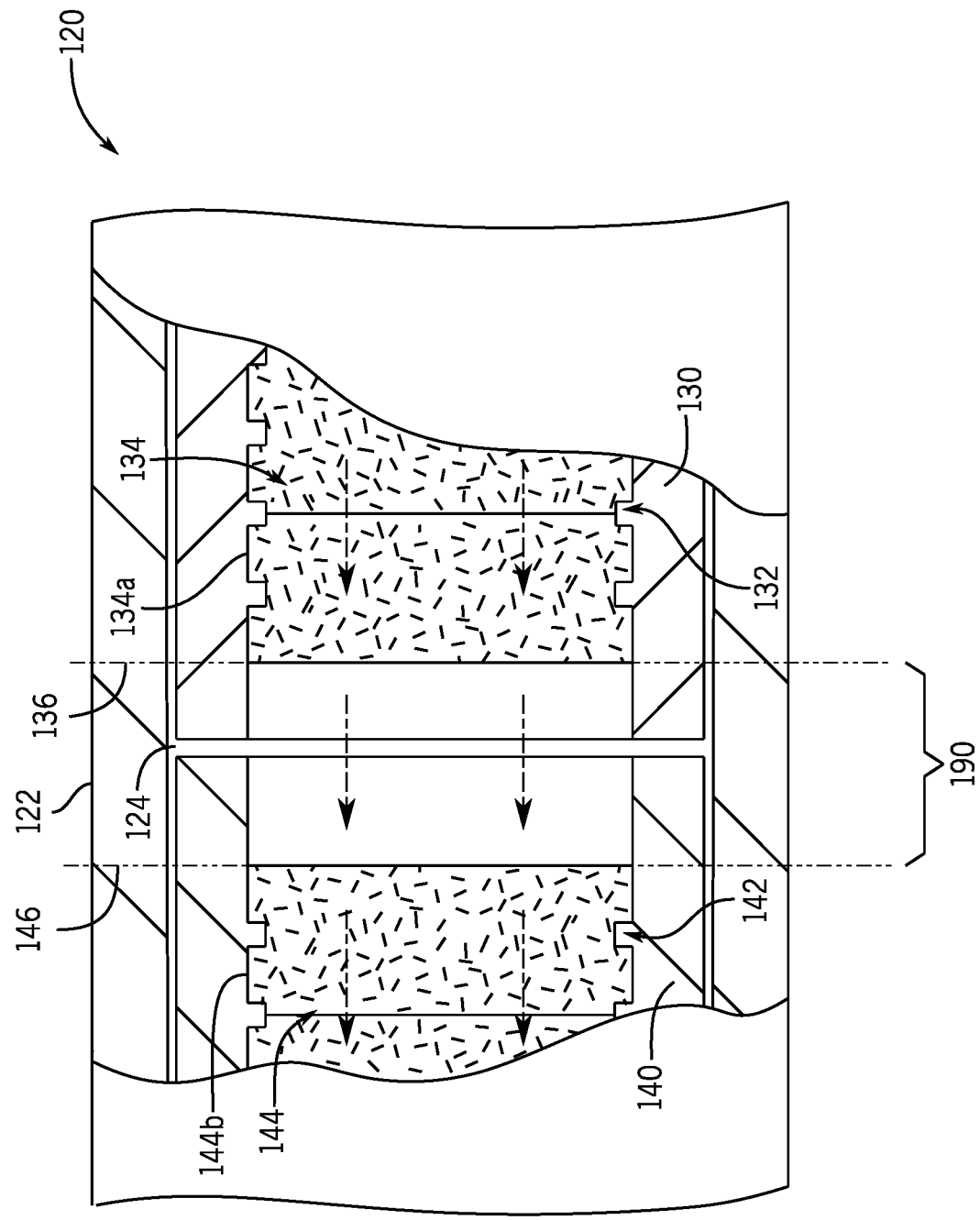
FIG. 1B depicts detail 1B-1B of FIG. 1A showing a foam generating device of FIG. 1A with a plurality of pad structures held by inserts of an insert assembly.

The cascade 108 is generated using one or more inserts arranged within the foam generating device 120. With reference to FIG. 1B, detail 1B-1B is shown of FIG. 1A depicting the foam generating device 120 in partial cutaway, revealing inserts and pad structures therein. For example, FIG. 1B shows the foam generating device 120 including a housing 122 with a housing volume 124. A first insert 130 and a second insert 140 are shown arranged within the housing volume 124. The first insert 130 and the second insert 140 may each be adapted to hold a plurality of pad structures or other fibrous or agitation media therein. Cleaning solution is advanced through the agitation media held by the first and second inserts 130, 140 for aeration of the solution and generation of foam.

In the example of FIG. 1B, the first insert 130 includes a first plurality of ribs 132 and a first plurality of pad structures 134. The first plurality of pad structures 134 may be formed from a porous media and are held within the first insert 130 by the first plurality of ribs 132. The first plurality of ribs 132 may grip or pinch the first plurality of pad structures 134 and impede movement of the first plurality of pad structures 134 along a flow path of the cleaning solution through the foam generating device 120. As further shown in FIG. 1B, the second insert 140 includes a second plurality of ribs 142 and a second plurality of pad structures 144. The second plurality of ribs 142 and the second plurality of pad structures 144 may be substantially analogous to the first plurality of ribs 132 and the first plurality of pad structures; redundant explanation of which is omitted here for clarity.

The first insert 130 and the second insert 140 are shown arranged in series within the housing volume 124. The first and second inserts 130, 140 are arranged in series and configured to allow the first plurality of pad structures 134 and the second plurality of pad structures 144 to directly face one another within the housing volume 124. In this regard, an intermediate space 190 may be defined between the first plurality of pad structures 134 and the second plurality of pad structures 144. The intermediate space 190 may be substantially free of intervening layers or other blockages to allow for optimal throughout of the cleaning solution between the first and second inserts 130, 140.

In the example of FIG. 1B, a first pad structure 134a of the first plurality of pad structures 134 is arranged at and generally defines an upper boundary 136 of the intermediate space 190. Further, a second pad structure 144b of the second plurality of pad structures 144 is arranged at and generally defines a lower boundary 146 of the intermediate space 190. The first pad structure 134a and the second pad structure 144b may be held with the first and second inserts 130, 140 in order to maintain a size of the intermediate space 190 during fluid flow through the foam generating device 120. For example, the first plurality of ribs 132 may pinch and at least partially deform the first pad structure 134a to secure the first pad structure 134a in a manner to withstand cleaning solution flow. Similarly, the second plurality of ribs 142 may pinch and at least partially deform the second pad structure 144b to secure the second pad structure 144b in a manner to withstand the cleaning solution flow. Accordingly, the first and second pad structures 134a, 144b may be held in place along the intermediate space 190 without reliance on structural supports placed directly in the cleaning solution flow path, such as without reliance on structural supports arranged along or on a longitudinal axis of the foam generating device 120.

Figure 2:
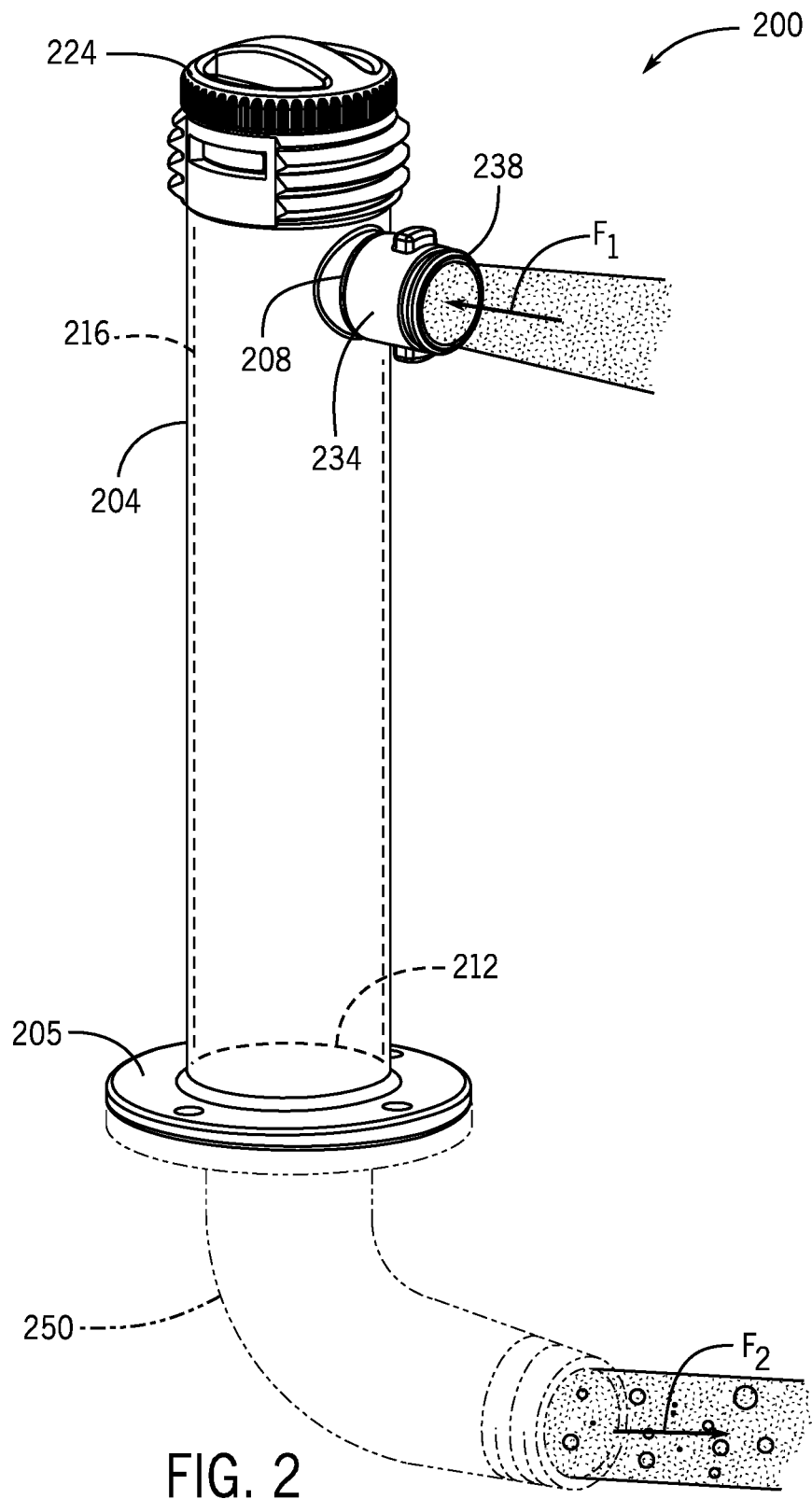
FIG. 2 depicts another foam generating device according to implementations of the present disclosure.

Turning to FIG. 2, an example foam generating device 200 is shown. The foam generating device 200 may be substantially analogous to the foam generating device 120 and/or any of the foam generating devices described herein. The foam generating device 200 includes a housing 204 with an insert holding cavity 216. The insert holding cavity 216 may be adapted to receive and hold one or more of the inserts or insert assemblies described herein. In this regard, the housing 204 may be configured to receive a flow of cleaning solution $F_1$ and direct the flow of cleaning solution $F_1$ to the inserts of the insert holding cavity 216 or compartment. In turn, a flow of foam product $F_2$ may be emitted by the foam generating device 200, as shown in FIG. 2.

To facilitate the foregoing, the housing 204 may include a housing inlet 208 and a housing outlet 212. The housing inlet 208 may be adapted to receive the flow of cleaning solution $F_1$ via a fitting 234. For example, the fitting 234 may having a fitting inlet 238 that is connectable to conduits, piping, or other components of a car wash system in order to deliver the flow of cleaning solution $F_1$ to the foam generating device 200. The flow of cleaning solution $F_1$ may therefore be received by the fitting inlet 238 and directed to the housing inlet 208 in order to advance into the insert holding cavity 216. In other cases, the fitting 234 may be omitted.

The housing outlet 212 may be defined at an end of the housing 204 opposite the housing inlet 208. The insert holding cavity 216 may be arranged between the housing inlet 208 and the housing outlet 212 such that the holding cavity 216 is fluidly coupled to the housing inlet 208 and the housing outlet 212. In this regard, the flow of the cleaning solution $F_1$ may traverse through the insert holding cavity 216, be agitated and aerated therein (via the operation of the inserts) and be emitted from the housing 204 as the flow of foam product $F_2$.

In some cases, the housing 204 may include a flange 205 at the housing outlet 212. The flange 205 may be used to connect the housing 204 of the foam generating device 200 to components of a car wash or other components of a cleaning system. As one example, the flange 205 may be connected to a fluid connector 250 (shown in phantom in FIG. 2). The fluid connector 250 may be an elbow or other fitting that fluidly connects the foam generating device 200 to a manifold (e.g., the manifold 160) or other component of a cleaning system.

The foam generating device 200 may be adapted to facilitate removal and replacement of inserts held therein by use of a cap 224. The cap 224 may seal the inserts within the insert holding cavity 216 and facilitate removal of inserts held within the insert holding cavity 216. For example, and with reference to FIG. 3, an exploded view of the foam generating device 200 is shown in which the cap 224 is separated from the housing 204. The cap 224 includes a handle portion 226 and a catch portion 228. The handle portion 226 may be used to manipulate the cap 224 relative to the housing 204. The catch portion 228 may extend integrally from the handle portion 226 and be adapted to extend at least partially into the housing 204 in order to facilitate the introduction and/or removal of the inserts into the insert holding cavity 216.

For example, the housing 204 may define an insert entry port 218. The insert entry port 218 may be connected to the insert holding cavity 216 internally within the housing 204. The insert entry port 218 may be adapted to receive inserts therethrough for placement within the insert holding cavity 216. The cap 224 may be adapted to introduce inserts into the insert entry port 218, for instance, using the catch portion 228, which may include a hook feature 230. The hook feature 230 may be used to releasably engage an insert, such as any of the inserts described herein. With the insert releasably engaged, the cap 224 with the catch portion 228 may be advanced through the insert entry port 218 advancing or retracting the insert within the insert holding cavity 216.

The cap 224 may be operable to close the insert entry port 218. For example, the cap 224 may be advanced at least partially through the insert entry port 218 and may be releasably secured to the housing 204. To facilitate the foregoing, the cap 224 is shown as including a cap latch feature 227. The housing 204 is shown as including a housing latch feature 219. The cap 224 may be advanced into the insert holding cavity 216 for engagement of the cap latch feature 227 and the housing latch feature 219 with one another. The cap latch feature 227 may be a protruding and flexible structure that deforms upon entry into the insert entry port 218. The cap latch feature 227 may snap into the housing latch feature 219, which may be a slot or through portion. To remove the cap 224, the cap latch feature 227 may be pressed in by a user, which may release the cap 224 for removal from the housing 204. In one example, the removable attachment of the cap 224 and the housing 204 may be facilitated by a ¼ turn threaded engage/disengage-type locking mechanism. The cap 224 and the housing 204 may have complementary threads, and the cap 224 may be rotated at least a ¼ turn relative to the housing 204 to facilitate the engagement of the housing latch feature 219 and the cap latch feature 227. In other examples, the cap 224 may be associated with the housing 204 via an interference or friction fit, with the cap latch feature 227 snapping into the housing latch feature 219 upon the cap 224 reaching a predetermined axial position relative to the housing 204.

The cap 224 may also include a window 232 at the catch portion 228. The window 232 may be configured to align with the housing inlet 208. The window 232 may be adapted to receive a flow of cleaning solution (e.g., the flow $F_1$) from the housing inlet 208 and direct the flow to inserts that are releasably coupled to the cap 224. For example and with reference to FIG. 4, a cross-sectional view of the foam generating device 200 is shown, with the window 232 substantially aligned with the housing inlet 208. In this regard, fluid may be received through the window 232 and advanced substantially into the cap 224 within the housing 204. The cap 224 may also define a passage 233, shown in the cross-sectional view of FIG. 4. The fluid may exit the cap 224 via the passage 233 and be directed toward inserts of the foam generating device 200 that are releasably coupled to the hook features 230 of the catch portion 228 (e.g., as shown and described with respect to FIG. 10).

Figure 4:
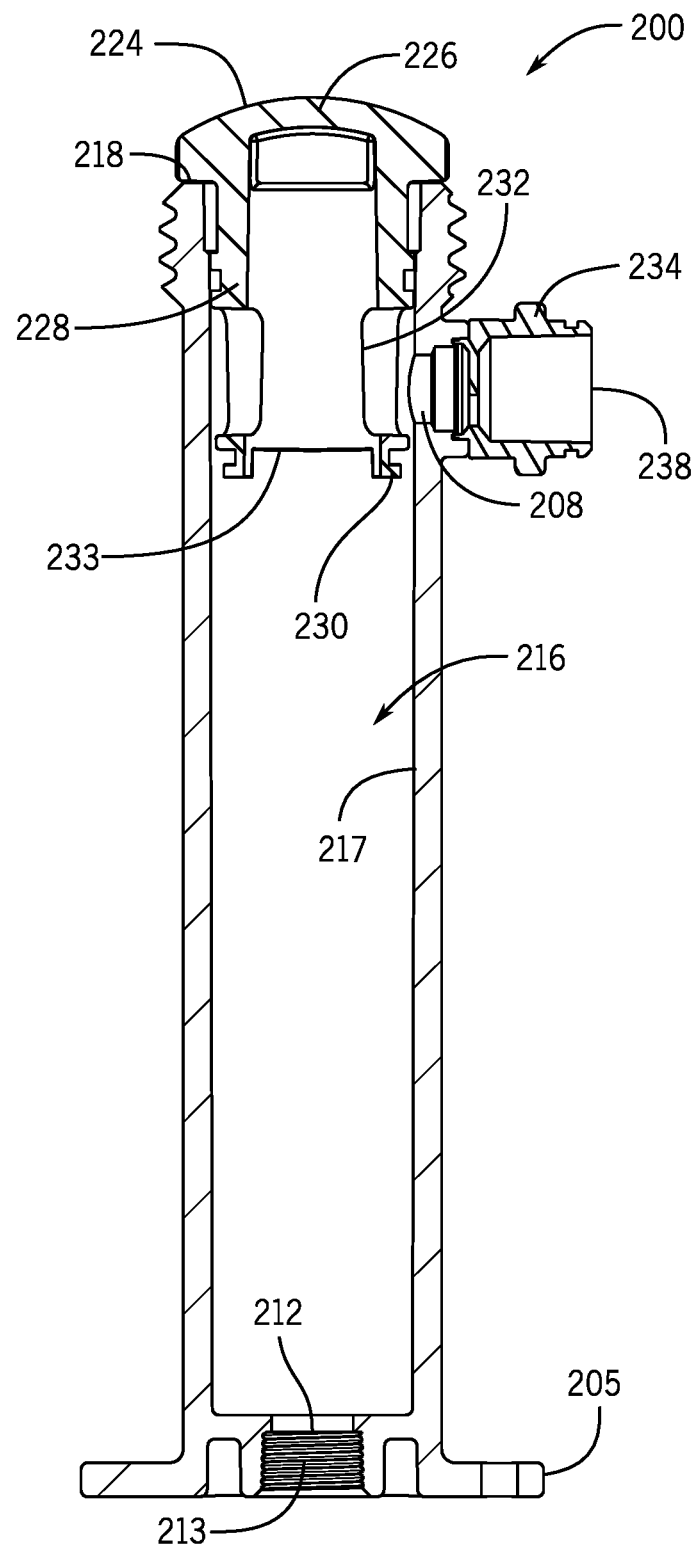
FIG. 4 depicts a cross-sectional view of the foam generating device of FIG. 3, taken along line 4-4 of FIG. 3.

The cross-sectional view of FIG. 4 also illustrates the insert holding cavity 216. The insert holding cavity 216 is defined by walls 217 that generally run vertically along a height of the housing 204. As described herein, one or more inserts are arranged with the insert holding cavity 216 and encircled therein by walls 217. FIG. 4 also shows the housing outlet 212 associated with threads 213. The threads 213 may be used to associate one or more components of a fluid system, e.g., of a vehicle cleaning or other system, to the foam generating device 200. In other cases, the threads 213 may be omitted.

Figure 5:
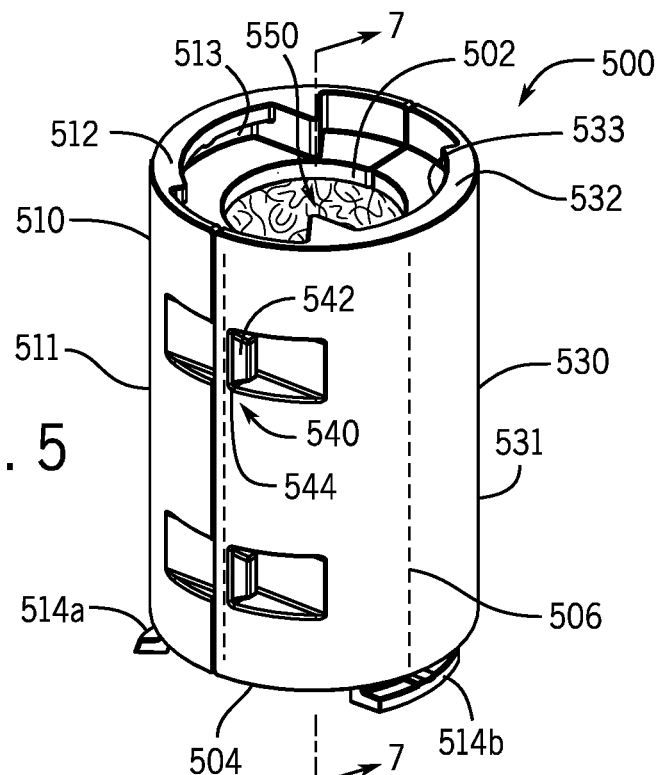
FIG. 5 depicts an insert including a plurality of pad structures according to implementations of the present disclosure.
Figure 6:
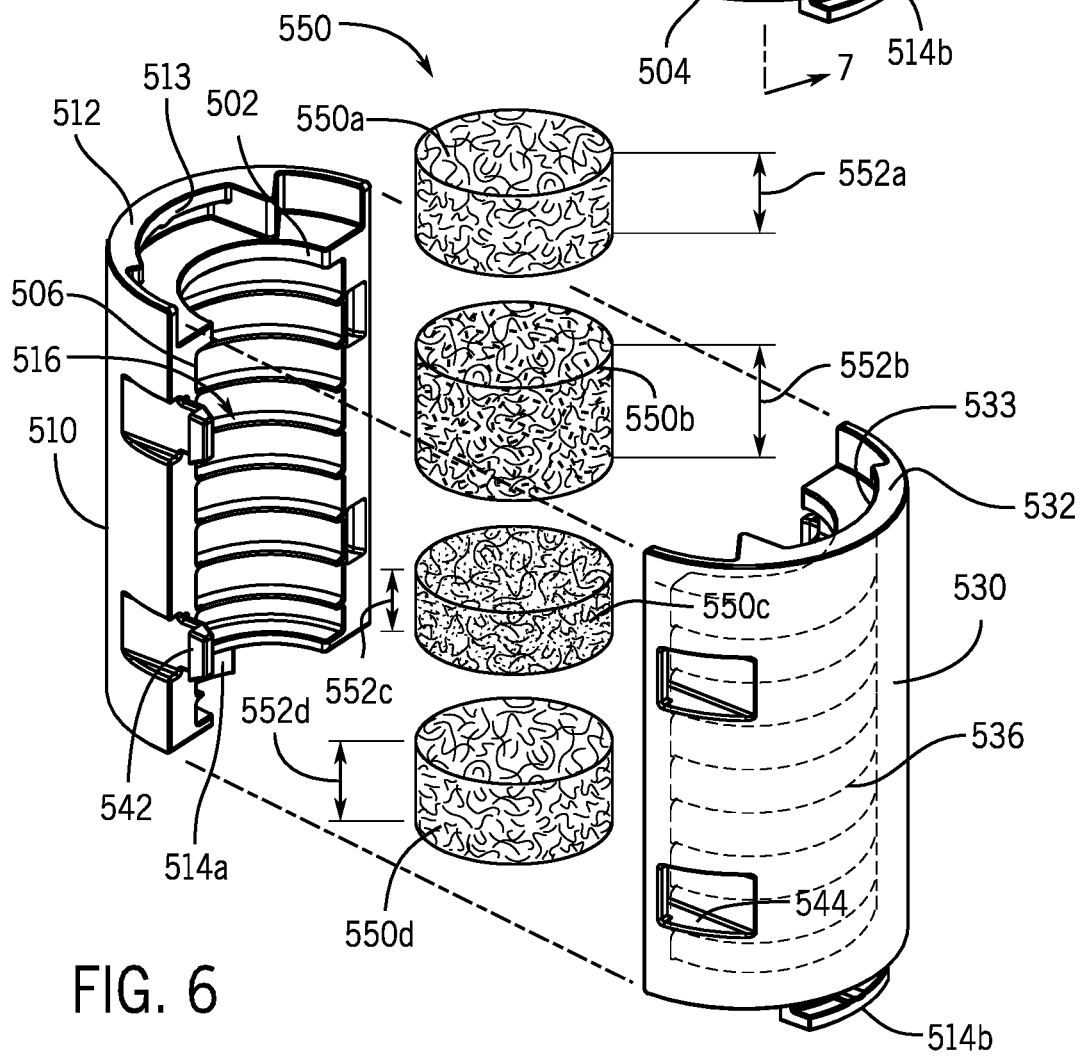
FIG. 6 depicts an exploded view of the insert of FIG. 5.
Figure 7:
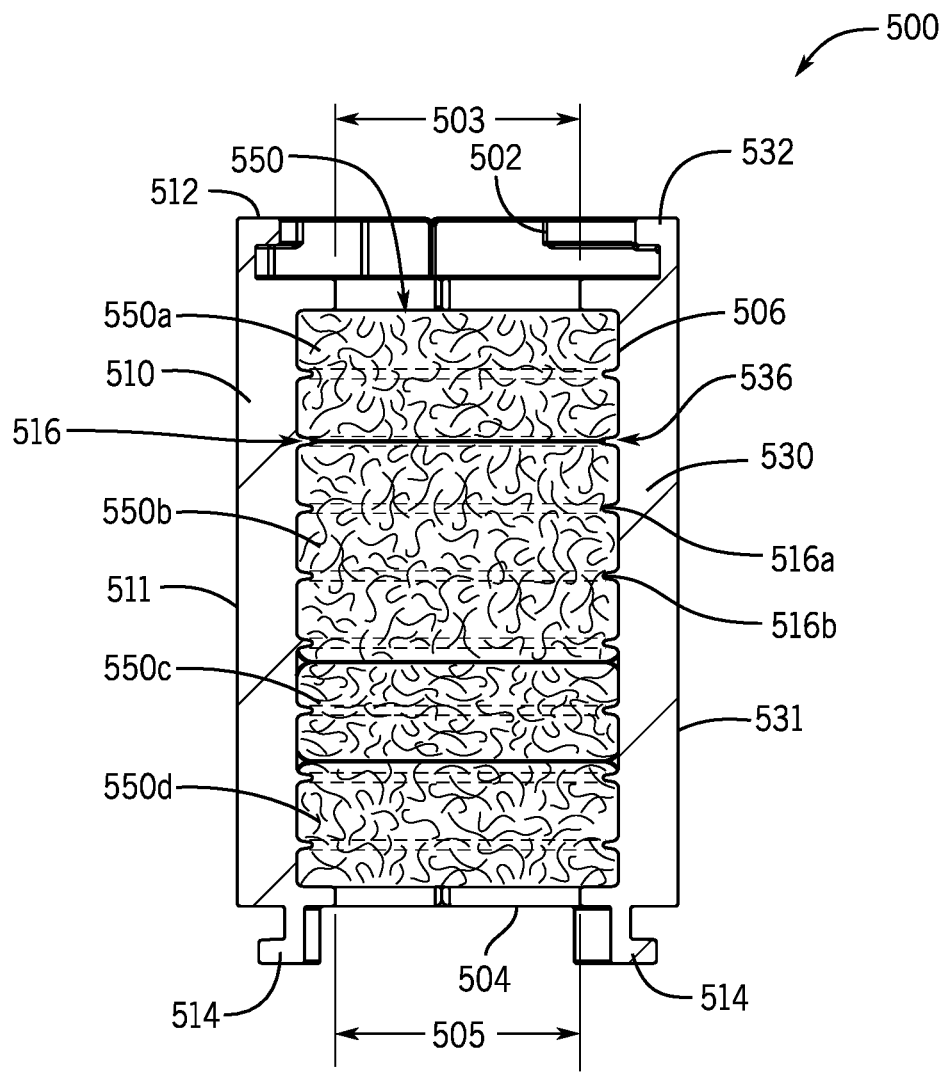
FIG. 7 depicts a cross-sectional view of the insert of FIG. 5, taken along line 7-7 of FIG. 5.

Turning to FIGS. 5-7, an insert 500 according to the present disclosure is shown. The insert 500 may generally be adapted to hold one or more pad structures or other porous agitation media therein. The insert 500 may be adapted to be received by any of the foam generating devices described herein, including the foam generating devices 120, 200. In this regard, the insert 500 may generally be adapted to receive a flow of cleaning solution and agitate and/or aerate the cleaning solution with the pad structure contained therein. In turn, the insert 500 may emit a foam product for use in cleaning a vehicle or for use in other operations.

With specific reference to FIG. 5, the insert 500 is shown as having an insert inlet 502 and an insert outlet 504. Broadly, the insert 500 also includes a channel 506 extending between the insert inlet 502 and the insert outlet 504. The insert 500 may be arranged in a foam generating device to receive a cleaning solution at the insert inlet 502. The insert 500 include a plurality of pad structures 550 arranged substantially with the channel 506 and fluidly coupled to the insert inlet 502. The cleaning solution may be advanced through the insert inlet 502 and agitated and/or aerated by the plurality of pad structures 550 to produce a foam product. The foam product may exit the insert 500 at the insert outlet 504.

As shown in FIG. 5, the insert 500 includes a first shell portion 510 and a second shell portion 530. The first and second shell portions 510, 530 may be substantially symmetrical halves of a shell. For example, the first shell portion 510 may have a body 511 that has a generally cylindrical contour with a concave interior surface that defines a portion of the channel 506. The second shell portion 530 may have a body 531 that has a generally cylindrical contour with a concave interior surface that defines another portion of the channel 506. The body 511 and the body 531 may be symmetrical. In some cases, the body 511 and the body 531 may be substantially identical structures, thereby facilitating manufacture of the insert 500 by allowing the insert 500 to be constructed from any two structures formed as the body 511 or the body 531.

The first shell portion 510 and the second shell portion 530 are releasably coupled to one another in order to facilitate removal and replacement of the plurality of pad structures 550 held within the channel 506. In this regard, the first and second shell portions 510, 530 may be separated and coupled and separated, repeatedly, without causing undue failure of the insert 500. To facilitate the foregoing, the insert 500 may include a series of closures 540. The series of closures 540 may include a clip closure 542 and a groove closure 544, as shown in FIGS. 5 and 6; however, other structures are contemplated herein. In the example of FIGS. 5 and 6 the each of the first and second shell portions 510, 530 includes coupling features such as clip closures 542 and groove closures 544. The clip closures 542 may be protruding, flexible structures that are releasably receivable by a corresponding groove closure 544 on the other of the first or second shell portion 510, 530. The groove closure 544 may catch the clip closure 542, securing the clip closure 542 in place. The clip closure 542 may receive a force from a user to flex the clip closure 542 and release the clip closure 542 from the groove closure 544.

Figure 10:
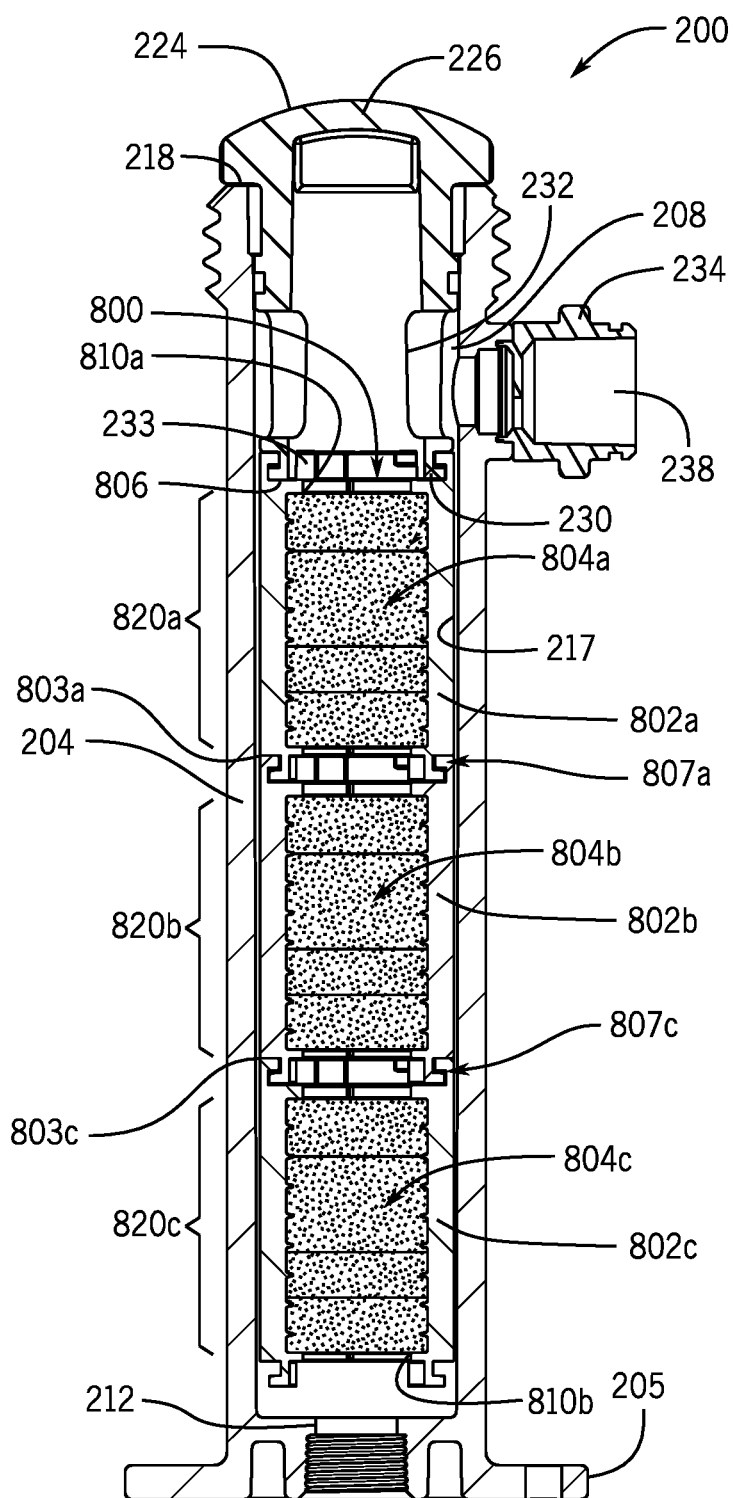
FIG. 10 depicts a cross-sectional view of the foam generating device of FIG. 2, taken along line 4-4 of FIG. 2 having the insert of assembly of FIG. 8 arranged therein.

The first and second shell portions 510, 530 also include additional or alternative coupling features to facilitate placement of the insert 500 in a foam generating device and to facilitate releasable coupling of the insert 500 with other inserts in order to form an insert assembly. For example, the first shell portion 510 includes a grooved feature 512. The grooved feature 512 defines an undercut 513 that is adaptable to receive a hook feature of a cap of a foam generating device (e.g., the hook feature 230 of FIG. 3). Further, the second shell portion 530 includes a grooved feature 532. The grooved feature 532 defines an undercut 533 that is adaptable to receive a hook feature, substantially analogous to that of the undercut 513, described above. In some cases, the grooved features 512, 532 may be arranged so that a hook feature of the cap may be received generally interposed with the grooves features 512, 532. The hook feature and/or the insert 500 may be rotated relative to one another so that the hook feature may be received by the undercuts 513, 533, for example, as shown in FIG. 10. Hook and groove features disclosed may be configured as bayonet locks, which for example, may be releasably attachable to one another by nesting the hook in the groove and partially rotating the components relative to one another by a partial turn, e.g., a ¼ turn. In other examples, the hook and groove features can be defined at least in part by a threaded connection, a feature to receive a cable, or substantially any number of other mechanisms to facilitate the attachment of the insert 500 to other inserts and/or to the cap, allowing the an insert assembly to be removed from a foam generating device as a single unit (e.g., as shown in FIG. 10).

The first and second shell portions 510, 530 also include various features to facilitate attachment of the insert 500 to other inserts. For example, the insert 500 may be one insert of a modular assembly, and the insert 500 may be configured for releasable engagement within the modular assembly. In one example, as shown in FIG. 5, the first shell portion 510 may include a clip 514a and the second shell portion 530 may include a clip 514b. The clips 514a, 514b may be protruding, partially flexible structures that are receivable by grooved features of another insert, as shown and described herein with respect to FIG. 9.

Turning to FIG. 6, an exploded view of the insert 500 is shown. In the exploded view, the plurality of pad structures 550 include a first pad structure 550a, a second pad structure 550b, a third pad structure 550c, and a fourth pad structure 550d. While the example of FIG. 6 shows four pad structures, in other examples, more or fewer pad structures may be used. The pads structures 550a-550d are generally stacked and arranged in series within the channel 506. Fluid may thus be received through the insert inlet 502 and progress successively through the first pad structure 550a, the second pad structure 550b, the third pad structure 550c, and the fourth pad structure 550d, and then exit the insert 500 via the insert outlet 504.

The pad structures 550a-550d are generally formed from porous media such as a sparse unwoven polymer such as cellulose, nylon or spun polypropylene and may resemble scouring pads. The pad structures may be compressible but may generally retain their shape when wet or dry. This may include certain fibrous materials that are adapted to agitate and break a flow of fluid that traverses therethrough. This breaking may introduce gas (e.g., air, oxygen, nitrogen, carbon dioxide, which may be compressed) into the fluid and thus aerate the fluid to form bubbles therein in order to form the foam product. In some cases, the pad structures 550a-550d may be formed as substantially identical structures and may be interchangeable with one another. In other cases, it may be advantageous to form one or more of the pad structures 550a-550d as having different physical properties, such as larger or smaller spaces between the pad media, finer or courser media. This may allow the insert 500 to be tailored to generate a foam product having certain characteristics, based in part on the pad structures arranged therein. To illustrate, the first pad structure 550a is shown as having a first height 552a and a first porosity. The second pad structure 550b is shown as having a second height 552b and a second porosity. The third pad structure 550c is shown as having a third height 552c and a third porosity. The fourth pad structure 550d is shown as having a fourth height 552d and a fourth porosity. The forgoing heights and porosities may all be different from one another. In other cases two or more may be substantially similar. Other arrangements are contemplated herein and tailored to a given application, based on target foam characteristics.

For example, the plurality of pad structures 550 are generally releasably held within the insert 500 and therefore may be interchanged and replaced as needed. As described herein, a plurality of ribs may secure the plurality of pad structures 550 within the insert 500. The plurality of ribs may extend generally horizontally relative to a longitudinal axis of the insert 500 and may engage an outermost surface of each of the pad structures 550a-550d, thereby minimizing fluid flow disruption through the channel attributable to the plurality of ribs.

In the example of FIG. 6, the first shell portion 510 is shown including a first plurality of ribs 516. The second shell portion 530 is shown including a second plurality of ribs 536 (shown in phantom in FIG. 6). The first and second plurality of ribs 516, 536 are generally shown as ridges or other raised structures extending elongated along an interior of the first and second shell portions 510, 530 respectively. In other cases, it will be appreciated that the first and second plurality of ribs 516, 536 can be formed additionally or alternatively as spikes, combs, knurling or the like to facilitate retention of pad structures 550 within the insert 500. When the first and second shell portions 510, 530 are releasably coupled to one another, the first and second plurality of ribs 516, 536 may cooperate to form a plurality of ribs that define continual circumferential ribs around the plurality of pad structures 550. The ribs 516, 536 may be dimensioned to at least partially extend into and deform the pad structures, helping to hold the pad structures in position within the channel 506.

With reference to FIG. 7, a cross-sectional view of the insert 500 is shown taken along line 7-7 of FIG. 5. In the cross-sectional view, the first and second shell portions 510, 530 are shown releasably engaged with one another and with the plurality of pad structures 550 secured therein. For example, FIG. 7 shows the plurality of ribs 516 of the first shell portion 510 extending at least partially into and gripping one or more pad structures of the plurality of pad structures 550. Further, the plurality of ribs 536 of the second shell portion 530 are shown extending at least partially into and gripping one or more pad structures of the plurality of pad structures 550. In this regard, the plurality of ribs 516, 536 may engage the plurality of pads 550 in a manner that impedes or prevents exit of the pads 550 from the insert 500. In some cases, two or more ribs may engage an individual pad structure to facilitate a secure connection. For example, and as shown in FIG. 7, a first rib 516*a* and a second rib 516*b* may be adapted to engage the second pad structure 550*b*. In other cases, three, four, or more ribs may be arranged to engage an individual pad structure.

Additionally, the insert 500 may be constructed to impeded or prevent exit of the pad structure 550 from the channel 506. As shown in FIG. 7, the first and second shell portions 510, 530 may cooperate to define an insert inlet width 503. The first and second shell portions 510, 530 may also cooperate to define an insert outlet width 505. The insert inlet width 503 and/or the insert outlet width 505 may be less than a width of any of the pad structures 550. Accordingly, with the pad structures 550 held within the channel 506, the reduced size of the insert inlet 502 and the insert outlet 504 relative to the size of the pads may impede the exit of the pad structures from the insert 500 as cleaning solution or foamed cleaning solution is advanced therethrough.

The inserts of the present disclosure may be associated with one another in order to form an insert assembly. In this regard, an insert may be a modular component that is connected to other inserts, optionally of similar or identical construction. The inserts may be arranged in series with a foam generating device and define multiple stages of foam generation therein.

Figure 8:
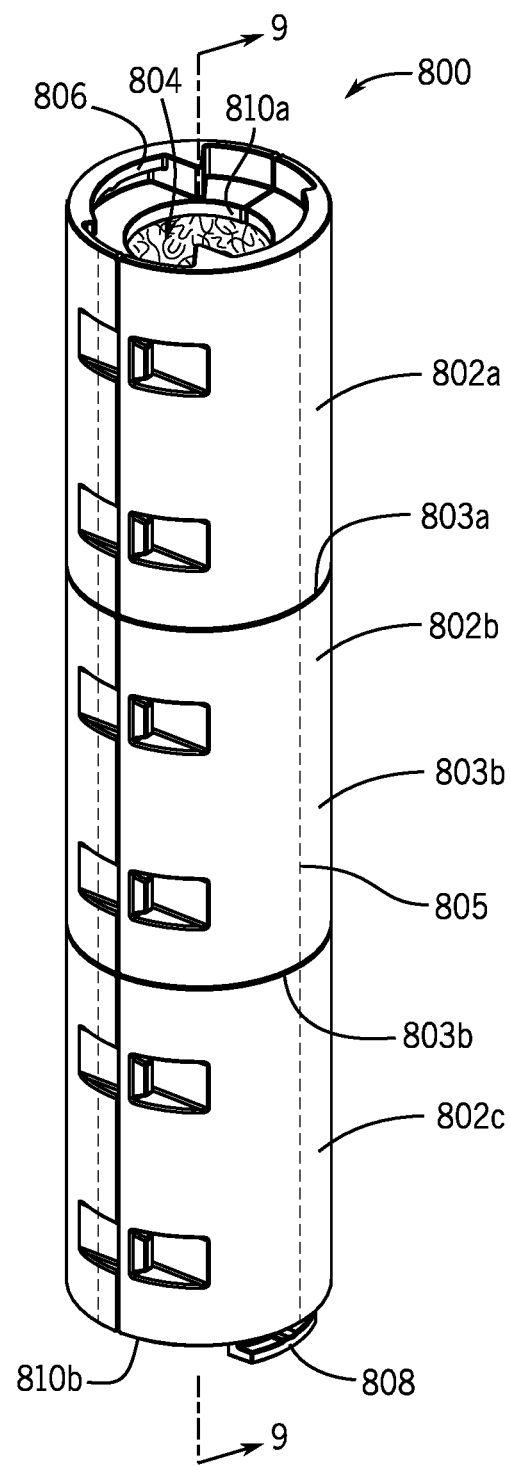
FIG. 8 depicts an insert assembly according to implementations of the present disclosure.
Figure 9:
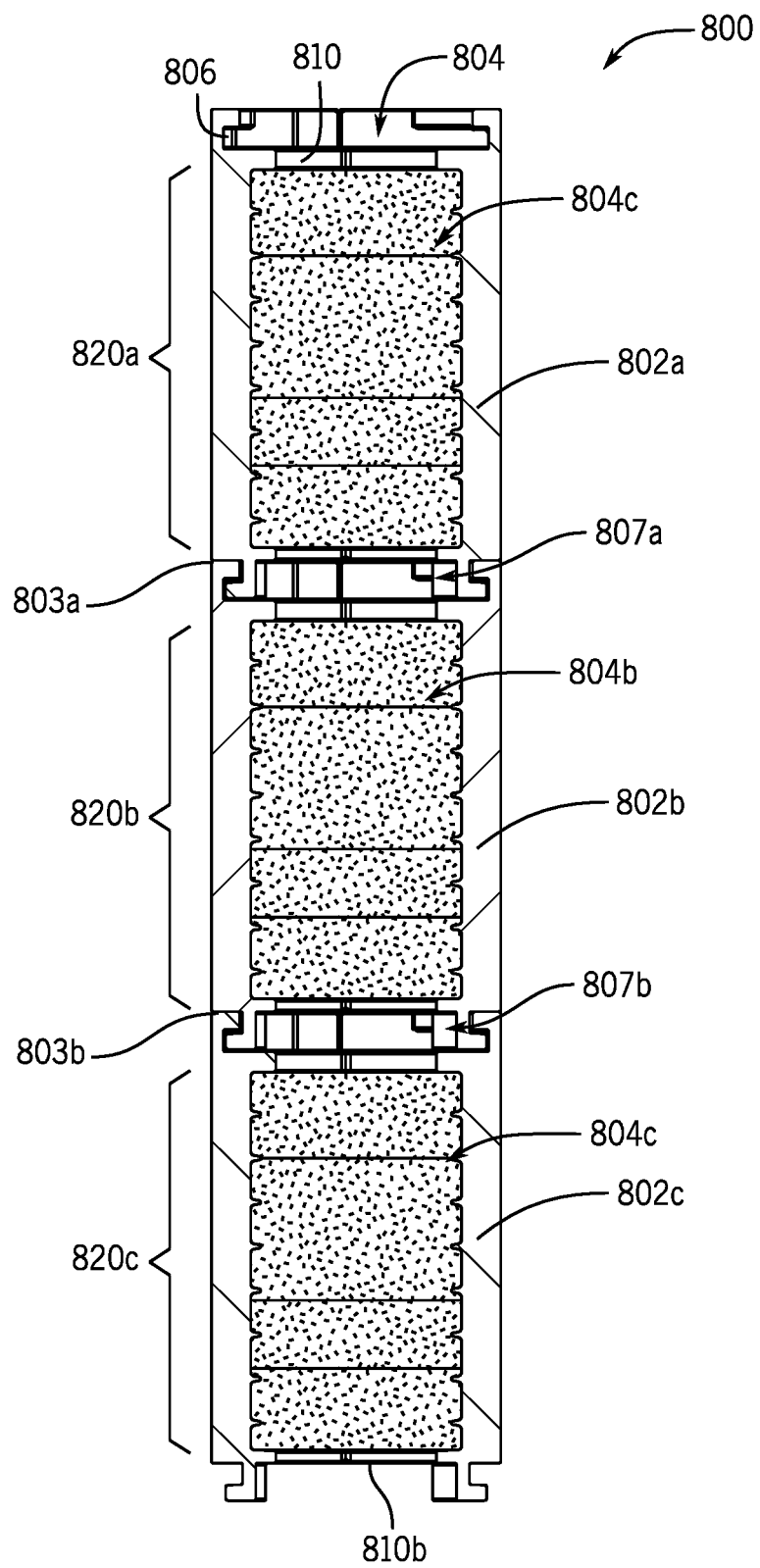
FIG. 9 depicts a cross-sectional view of the insert assembly of FIG. 8, taken along line 9-9 of FIG. 8.

Turning to FIGS. 8 and 9, an insert assembly 800 is shown. The insert assembly includes a first insert 802*a*, a second insert 802*b*, and third insert 802*c*. The inserts 802*a*-802*c* may be substantially analogous to any of the inserts described herein, such as the insert 500 of FIG. 5; redundant explanation of which is omitted here for clarity. The inserts 802*a*-802*c* are shown arranged in series, with the first and second inserts 802*a*, 802*b* defining a first interface 803*a*, and the second and third inserts 802*b*, 802*c* defining a second interface 803*b*. It will be appreciated that while three inserts are shown in FIG. 8, the insert assembly 800 may include more or fewer inserts as needed for a given application.

The insert assembly 800 may define an assembly inlet 810*a* and an assembly outlet 810*b*. In the example of FIG. 8, an inlet of the first insert 802*a* defines the assembly inlet 810*a* and an outlet of the third insert 802*c* defines the assembly outlet 810*b*. In other cases, other inserts may define the assembly inlet and/or outlet 810*a*, 810*b*, based in part on a quantity of inserts releasably coupled to one another within the assembly 800.

The assembly 800 is adapted to receive a flow of fluid, such as a cleaning solution, at the assembly inlet 810*a*. The inserts 802*a*-802*c* may collectively define an assembly channel 805 that extends between the assembly inlet 810*a* and the assembly outlet 810*b*. A plurality of pad structures 804 is arranged within the assembly channel 805 and fluidly coupled between the assembly inlet 810*a* and the assembly outlet 810*b*. As described herein, the plurality of pad structures 804 may include a plurality of pad structures for each of the inserts 802*a*-802*c*. In this regard, the cleaning solution may be received at the assembly inlet 810 and introduced into the assembly channel 805. The cleaning solution may be caused to pass through each of the plurality of pad structures 804 within the assembly channel 805 in order to agitate and aerate the fluid and form a foam product. The foam product may exit the assembly 800 via the assembly outlet 810*b*.

The assembly 800 is shown in FIG. 8 as further including a first end coupling 806 and a second end coupling 808. The first end coupling 806 may be a grooved feature of the first insert 802*a* in the example of FIG. 8. In other examples, other inserts may define the first end coupling 806. The first end coupling 806 may broadly be adapted to releasably connect the assembly 800 to a cap (e.g., the cap 224 of FIG. 2) or other features of a foam generation device. The first end coupling 806 may therefore be used to introduce and remove the assembly 800 from a foam generation device, as described herein. The second end coupling 808 may be clips of the third insert 802*c* in the example of FIG. 8. In other examples, other inserts may define the second end coupling 808. The second end coupling 808 may broadly be adapted to releasably connect another insert to the assembly 800. For example, another insert may include grooved features, such as grooved features of any of the inserts described herein, and the second end coupling 808 may be inserted into the groove features, thereby allowing the assembly 800 to be defined by four individual inserts. Analogously, more inserts may be added to the assembly 800.

Turning to FIG. 9, a cross-sectional view of the insert assembly 800 is shown taken along line 9-9 in FIG. 8. In the cross-sectional view, the inserts 802*a*-802*c* are shown arranged in series to define a flow path for cleaning or other solution from the assembly inlet 810*a* to the assembly outlet 810*b*. The flow path traverses each of the inserts 802*a*-802*c* so that the cleaning solution may be agitated by pad structures contained within each of the respective inserts. This approach may facilitate multi-stage foam generation in which the cleaning solution is agitated and/or aerated in a sequence, and additively in order to produce the foam product emitted at the assembly outlet 810*b*.

To facilitate the foregoing, in the example of FIG. 8, the first insert 802*a* is shown as including a first plurality of pad structures 804*a*, the second insert 802*b* is shown as including a second plurality of pad structures 804*b*, and the third insert 802*c* is shown as including a third plurality of pad structures 804*c*. The pad structures 804*a*, 804*b*, 804*c* may collectively define the plurality of pad structures 804 described above with respect to FIG. 8. With the first plurality of pad structures 804*a*, the first insert 802*a* may define a first stage of fluid agitation 820*a*. Further with the second plurality of pad structures 804*b*, the second insert 802*b* may define a second stage of fluid agitation 820*b*. Further with the third plurality of pad structures 804*c*, the third insert 802*c* may define a third fluid stage of fluid agitation 820*c*.

The stages of fluid agitation 820*a*-820*c* may be tailored to break the flow of the cleaning solution in a predetermined manner. As one example, the plurality of pads of the respective one of the stages 820*a*-820*c* may have a porosity, height, composition or other characteristic tuned to agitate the solution to a desired level at the respective stage. Also shown in FIG. 9, the stages 820*a*-820*c* may be separated by an intermediate layer. For example, the assembly 800 may define a first intermediate layer 807*a* at the first interface 803*a*. The assembly 800 may also define a second intermediate layer 807*b* at the second interface 803*b*. The intermediate layers 807*a*, 807*b* may be free of any intervening layers or structural components of the assembly 800. For example, the pad structures of the respective stages 820*a*-820*c* may directly face one another across the respective intermediate layers, and thereby enhance throughput through the assembly 800 during the generation of the foam product.

Figure 3:
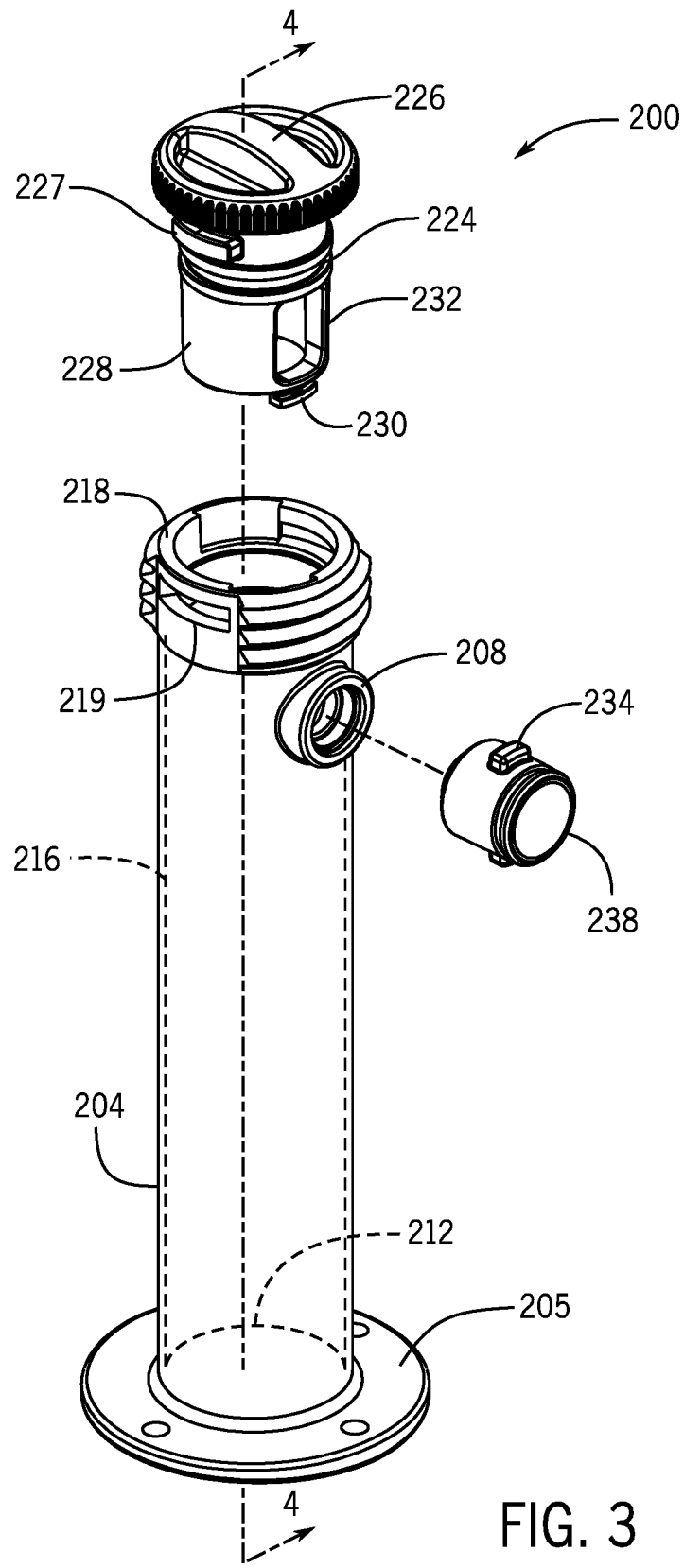
FIG. 3 depicts an exploded view of the foam generating device of FIG. 2.

FIG. 10 depicts a cross-sectional view of the foam generating device 200 of FIG. 2, taken along line 4-4 of FIG. 3 having the insert of assembly 800 of FIG. 8 arranged therein. The insert assembly 800 may be releasably coupled to the cap 224. For example and as shown in FIG. 10, the hook feature 230 of the cap 224 is shown engaged with the first end coupling 806 of the assembly 800. In this regard, the cap 224 may be manipulated relative to the housing 204 and separated from the housing 204. This manipulation of the cap 224 may in turn cause the assembly 800 to be removed from the housing 204 as the assembly 800 moves with an axial movement of cap 224 away from the housing 204.

FIG. 10 also illustrates a flow path of fluid through the foam generating device 200 in order to product the foam product. For example and as described above, the foam generating device 200 may be adapted to receive a flow of cleaning solution at the fitting inlet 238. The cleaning solution may proceed through the fitting 234 and into the housing 204 via the housing inlet 208. The cleaning solution may then proceed from the housing inlet 208 and through the window 232 of the cap 224 and to the insert assembly 800. For example, the assembly inlet 810a of the insert assembly 800 may be fluidly coupled to the housing inlet 208 via the window 232 and thus be adapted to receive the flow of cleaning solution via the window 232. The cleaning solution may then proceed through the inserts 802a, 802b, 802c, successively, in order to produce the foam product. For example, the cleaning solution may be agitated and aerated in stages, such as through the first stage 820a defined by the first insert 802a, the second stage 820b defined by the second insert 802b, and the third stage 820c defined by the third insert 802c. The insert assembly 800 may emit the resulting foam product at the assembly outlet 810b. The foam product may proceed from the assembly outlet 810b to the housing outlet 212. The foam generating device 200 may emit the foam product at the housing outlet 212.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and Band C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Consequently, variations and modifications commensurate with the teachings, and skill and knowledge of the relevant art, are within the scope of the disclosure.

What is claimed is:

1. An insert assembly, comprising:
a plurality of inserts releasably coupled in a serial arrangement to one another to form an insert assembly, wherein each insert of the plurality of the inserts comprises a shell defining a channel therethrough, and wherein the shells each comprise a plurality of gripping structures extending along an interior surface thereof to grip and hold porous pad structures within the channel, the gripping structures being arranged transversely to a longitudinal axis of the serially arranged inserts.

2. The insert assembly claim 1, wherein the gripping structures comprise one or more ribs, spikes, combs, or knurling.

3. The insert assembly of claim 1, wherein a first plurality of porous pad structures define a first stage of fluid agitation in the channel, a second plurality of pad structures define a second stage of fluid agitation in the channel, and wherein the first plurality of porous pad structures has a first thickness and the second plurality of pad structures has a second thickness.

4. The insert assembly of claim 1, wherein the plurality of inserts define coupling features operatively coupleable with one another.

5. The insert assembly of claim 4, wherein one of the coupling features defines a grooved feature and another of the coupling features defines a clip receivable by the grooved feature.

6. The insert assembly of claim 4, wherein one of the plurality of inserts are rotatably coupleable to one another by the coupling features.

7. The insert assembly of claim 1, wherein the inserts define intermediate spaces between the pad structures, the inserts configured such that the pad structures are prevented from entry into the intermediate spaces.

8. The insert assembly of claim 1, wherein the shells comprises a first shell portion and a second shell portion coupleable to each other to define a portion of the channel.

9. The insert assembly of claim 1, wherein the shells are releasably coupleable to each other by complementary releasable closures such that the pad structures can be removably arranged in the shells.

10. A foam generating device, comprising,
an insert assembly, comprising:
a plurality of inserts releasably coupled in a serial arrangement to one another to form an insert assembly,
wherein each insert of the plurality of the inserts comprises a shell defining a channel therethrough, and
wherein the shells each comprise a plurality of gripping structures extending along an interior surface thereof to grip and hold porous pad structures within the channel, the gripping structures being arranged transversely to a longitudinal axis of the serially arranged inserts; and
a housing adapted to hold the insert assembly therein, wherein the plurality of pad structures of the insert are fluidly coupled with an inlet of the housing and an outlet of the housing.

11. The foam generating device of claim 10, wherein the housing further comprises an entry port for receiving the insert assembly.

12. The foam generating device of claim 11, wherein the entry port is sealable by a cap.

13. The foam generating device of claim 12, wherein the cap is configured for releasable attachment with the insert assembly such that the insert assembly is movable via the cap.

14. The foam generating device of claim 10, wherein the gripping structures comprise one or more ribs, spikes, combs, or knurling.

15. The foam generating device of claim 10, wherein the inlet is arranged at a first end of the housing and the outlet is arranged at a second end of the housing opposite from the first end.

16. The foam generating device of claim 10, wherein the first end of the housing is configured to be fluidly coupled to a fluid source.

17. The foam generating device of claim 16, wherein the second end of the housing is configured to be fluidly coupled to a conduit for emitting a foam product from the outlet of the housing.

18. A method of using a foam generating device, comprising:
- inserting an insert assembly into a housing adapted to hold the insert assembly therein, the insert assembly comprising:
  - plurality of inserts releasably coupled in a serial arrangement to one another to form an insert assembly,
  - wherein each insert of the plurality of the inserts comprises a shell defining a channel therethrough, and
  - wherein the shells each comprise a plurality of gripping structures extending along an interior surface thereof to grip and hold porous pad structures within the channel, the gripping structures being arranged transversely to a longitudinal axis of the serially arranged inserts;
- causing a fluid to flow through an inlet of the housing, wherein the fluid passes through the pad structures within the housing to form a foam, and wherein the foam is emitted from an outlet of the housing.

19. The method of claim 18, further comprising causing the foam to traverse intermediate spaces defined in the channel.

* * * * *